US006886617B2

(12) United States Patent
Eynard et al.

(10) Patent No.: US 6,886,617 B2
(45) Date of Patent: May 3, 2005

(54) TIRE BEAD WITH PROTECTIVE RIB

(75) Inventors: Claude Eynard, Peyriac de Mer (FR);
André Peyrot, Clermont-Ferrand (FR);
Jean-Luc Bouvier, Enval (FR); Adam Jara, Clermont-Ferrand (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 10/762,620

(22) Filed: Jan. 21, 2004

(65) Prior Publication Data
US 2004/0194865 A1 Oct. 7, 2004

Related U.S. Application Data

(63) Continuation of application No. PCT/EP02/08279, filed on Jul. 25, 2002.

(30) Foreign Application Priority Data

Jul. 31, 2001 (FR) .......................................... 01 10296

(51) Int. Cl.$^7$ ..................... B60C 15/024; B60C 13/02
(52) U.S. Cl. ...................................... 152/544; 152/523
(58) Field of Search ................................ 152/544, 523

(56) References Cited

U.S. PATENT DOCUMENTS 6,789,590 B2 * 9/2004 Caretta ................... 152/544 X
2001/0006085 A1    7/2001 Chandezon et al.

FOREIGN PATENT DOCUMENTS

EP    0983875 A2    3/2000
JP    04-215508 A   3/1992

OTHER PUBLICATIONS

International Preliminary Examination Report PCT/EP02/08279, completed Feb. 12, 2003.
International Search Report PCT/EP/08279, completed Sep. 24, 2002.

* cited by examiner

Primary Examiner—Adrienne C. Johnstone
(74) Attorney, Agent, or Firm—Burns, Doane, Swecker & Mathis, LLP

(57) ABSTRACT

A tire P with a radial carcass reinforcement (1), intended for mounting on a rim J at least one of whose seats (42) is inclined outwards and is extended axially on the outside by a hump (41) of small height, said hump comprising an axially outer wall (411), and comprising two sidewalls (8) and at least one bead (5) with a heel axially on the inside and a bead toe axially on the outside, said bead (5) being provided with a protective rib T extending in the circumferential direction and axially further away from the equatorial plane than the axially outer wall (411) of the hump (41) of the rim in order to protect said rim J, the profile of the lower face BC connecting the axially outer face AB of the protective rib T and the profile of the bead (5) being totally located radially outside a virtual segment whose ends are on the one hand the radially innermost point B of the axially outer face AB of the rib T, and on the other hand the last point C' of the tire bead which is in contact with the hump of the rim.

8 Claims, 2 Drawing Sheets

TIRE BEAD WITH PROTECTIVE RIB

CROSS-REFERENCE TO RELATED APPLICATIONS

This application is a continuation of International Application No. PCT/EP02/08279, filed 25 Jul. 2002 and published 13 Feb. 2003 in French as International Publication No. WO 02/055325 A1.

FIELD OF INVENTION

The present invention concerns a tire with radial carcass reinforcement, in particular one with a small form ratio H/S, H being the height of the tire on its rim and S being its maximum axial width, designed for mounting on a rim at least one of whose rim seats is inclined outwards and extended, axially on the outside, by a hump of small height. More particularly, it concerns the beads of such a tire.

BACKGROUND OF INVENTION

The external shape of such a tire bead is described among other characteristics in U.S. Pat. No. 6,092,575. The external shape and in particular the axially outer wall of the bead is axially set back relative to the axially outermost end of the rim; consequently, the axially outermost metallic parts of the rim are not protected against aggressions due to curbs, for example, during urban driving. The particular structure of the bead, whose heel is axially on the inside and whose toe is axially on the outside, is described in U.S. Pat. No. 6,179,028: the turning-up of the carcass reinforcement around the anchoring bead wire and a wedge of rubber mixture with high hardness and essentially triangular shape, results in the presence of reinforcing elements of the carcass reinforcement close to the axially outer wall of the bead, and consequently to the possibility that such elements may be damaged. The desire to ensure simultaneous protection of the metallic parts of the rim and of the reinforcing elements of the carcass reinforcement led the applicant to adapt the axially outer shape of the toe of the bead, an adaptation that resulted in covering the edge of the outer hump of the rim with a more or less large mass or protuberance of rubber of appropriate quality, which made the maximum axial width of the external contour of the toe of the bead greater than the bulk or maximum axial width of the mounting rim.

Although this protuberance provides satisfactory protection for the corresponding hump of the rim, it is in contrast very sensitive on the one hand to abrasion when the tire scrapes against an external object such as a kerbside and on the other hand to the detachment of bits of rubber resulting from the initiation and propagation of cuts and/or breaks. International application PCT 99/64258 recommends providing said protuberance with incisions of non-zero width and depth at most equal to 5 mm, these incisions delimiting ribs orientated essentially in the meridian direction and parallel to one another.

The solution described above is not totally satisfactory from the standpoint of rubber detachment, with the consequence of damage to the carcass reinforcement upturn that is hardly compatible on the one hand with aesthetic appearance and on the other hand with the need for safety, both naturally being demanded by the users.

The purpose of the present invention is to propose a different solution to overcome the drawbacks described above, and consists in replacing the protuberance of the bead designed to be radially in contact with the rim hump by a protective rib or protuberance of appropriate shape, positioned in a suitable way.

SUMMARY OF THE INVENTION

According to the invention, the tire with radial carcass reinforcement intended for mounting on a rim J at least one of whose seats is inclined outwards and extended axially on the outside by a hump of small height, said hump having an axially external wall, comprises at least one bead having a heel axially on the inside and a toe axially on the outside, said bead being provided with a protective rib or protuberance extending in the circumferential direction, this protective rib having at least one point axially further away from the equatorial plane than the axially outer wall of the rim hump in order to protect said rim. The tire is characterized in that, when mounted on its mounting rim and viewed in meridian cross-section (i.e. in a section plane containing the rotation axis):

said circumferential protective rib is delimited axially on the outside by an axially outer face connected to the outer walls of the sidewall and bead by respective radially upper and lower faces, the axially outermost point(s) of the axially outer face of the protective rib is/are a distance e at least equal to 0.5 mm further out than the axially outer wall of the hump of the rim, the radial distance d' between the radially innermost point of the axially outer face of the rib and the radially outermost point of the rim hump, is larger than 4 mm, the angle of the segment joining the end points of the axially outer face of the protective rib with a direction perpendicular to the rotation axis is at most equal to ±10°, the entire profile of the lower face connecting the axially outer face of the protective rib and the profile of the bead is located radially outside a virtual line segment whose ends are on the one hand the radially innermost point of the axially outer face of the protective rib and, on the other hand, the last point of the tire bead that is in contact with the hump of the rim (when the tire is inflated).

Thanks to the characteristics specified above, when the tire according to the invention is mounted on its rim, it offers very good protection against external aggressions to said rim. Besides, the distancing of the rib as described enables detachment of rubber from the rim to be avoided, so that the protection is lasting.

The combination of characteristics described makes it possible, while providing effective protection for the parts of rims exposed to aggression by external objects, to obtain satisfactory performance of the tire bead by virtue of appropriate bead flexibility, while avoiding any risk that the rib might be squashed between the external object and the hump of the rib.

For better protection it is advantageous if the distance e is between 1 and 1.5 mm. Preferably, the length of the segment joining the end points of the axially outer face of the protective rib is between 5 and 10 mm, so as to achieve good protection of the rim without unduly increasing the weight of the tire.

The angle between the line segment joining the end points of the axially outer face of the protective rib and a direction perpendicular to the rotation axis is preferably equal to at most ±5° in order to avoid localized excess pressures during contact with an external object and also to avoid excessively localized wear due to scraping.

The lower connecting face can be cylindrical, frustoconical or curved, said face being joined to the wall of the bead and to the axially outer face by slightly rounded junctions, for the purpose, known in its own right, of avoiding stress concentrations.

The upper connecting face extends essentially between the radially outermost point of the axially outer face of the protective rib and a point on the outer wall of the tire sidewall defined as being at a radial distance at least equal to twice the length of the segment joining the end points of the axially outer face of the protective rib. This upper connecting face is preferably located entirely radially outside a line passing through the radially outermost point of the axially outer face of the protective rib and tangential at that point to said profile, this line making an angle of at most 55° with the equatorial plane, this feature making it possible to offer minimum purchase to obstacles and so limiting their indentation and enabling slippage to occur between the obstacle and the protective rib. Viewed in meridian section, this upper connecting face can in particular have the shape of an arc of a circle.

In addition, it is advantageous to reinforce the outer walls of the protective rib with at least one reinforcement comprising textile reinforcements (for example Nylon®) embedded in a rubber mixture of appropriate nature (in particular, one which has good abrasion resistance).

By virtue of the fact that the protective rib is displaced radially outwards relative to the hump of the rim, a new shape of the outer wall of the bead has been developed which offers the advantage of allowing a considerable increase of the contact pressure between the bead of the tire and the rim seat when the latter is inclined outwards (i.e. when the axially outermost point of its generatrix is located a distance away from the rotation axis which is smaller than the distance between said axis and the axially innermost point of said generatrix).

This increase of contact pressure ensures better airtightness of the tire assembly, better seating of the bead on the rim, and an appreciable reduction of rotation movements of the bead relative to its rim, in particular under the action of forces exerted by the ground on the tire during rolling. To that end, as viewed in a meridian section plane, the profile of the outer wall of the bead designed to come into contact with the inside profile of the rim hump is extended radially outwards so that it does not contact the radially outer part of said hump. The absence of contact between the bead and the radially outer part of the rim hump allows a certain free sliding movement between the bead and said rim hump in the meridian section plane under the action of tensile forces in the carcass reinforcement; if this arrangement is implemented for both beads of the tire, there is also some increase of the tire bursting pressure.

Of course, this configuration relating to the bead profile can be used regardless of whether the protective rib is present. For example, it is possible to have no protective rib on the side of the tire intended to face inwards on a vehicle. The same would be true with a tire having no protective ribs at all and designed for fitting on a rim both of whose seats are inclined outwards.

BRIEF DESCRIPTION OF THE DRAWINGS

The characteristics of the invention will be better understood with the help of the drawings attached to the description below, showing variant embodiments of the tire according to the invention, given as non-limiting examples and in which.

DESCRIPTION OF THE PREFERRED EMBODIMENTS

Figure 1:
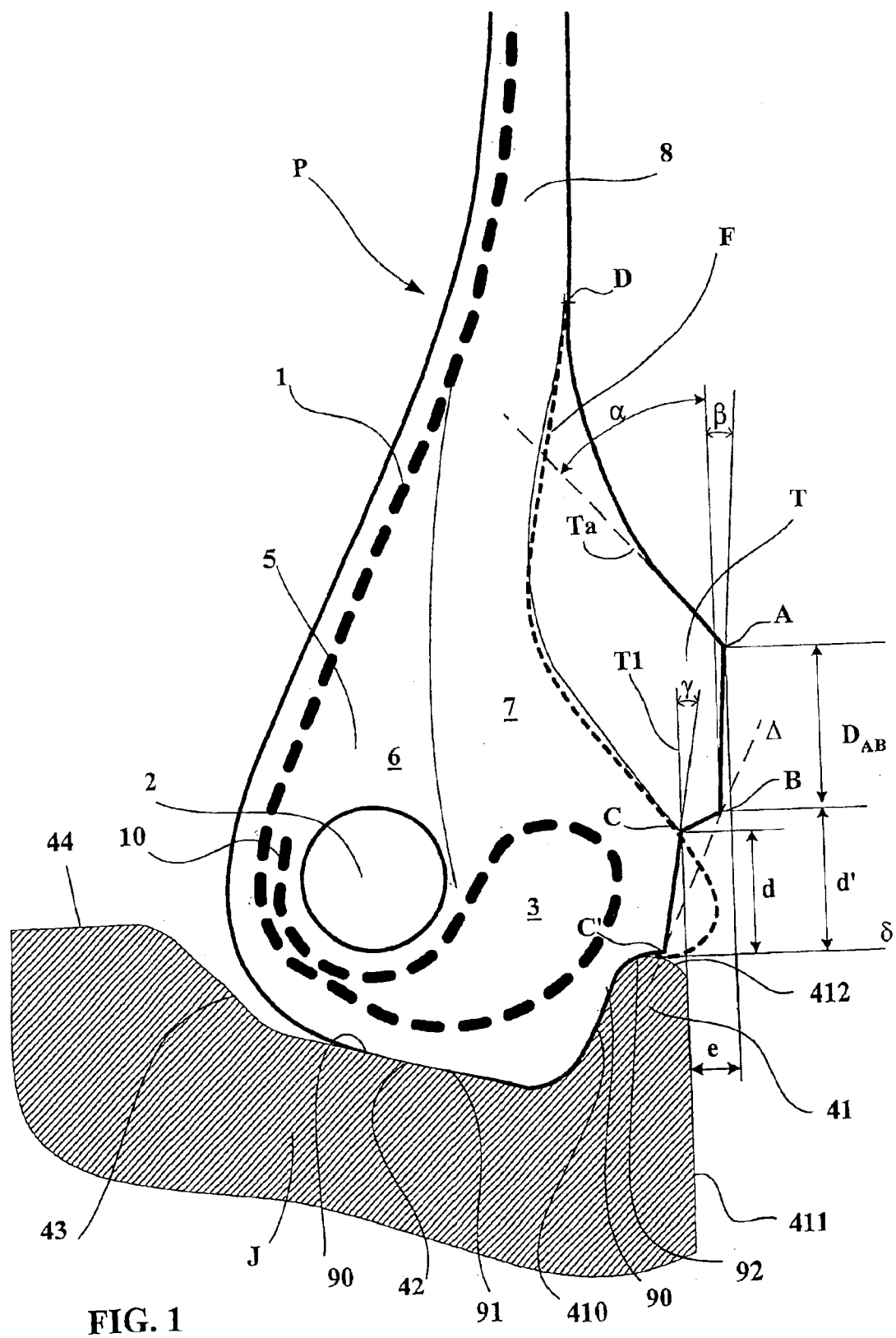
FIG. 1 shows a first variant of a tire according to the invention.

FIG. 1 shows a partial, schematic meridian cross-section of a tire P according to the invention, fitted on a mounting rim J.

The sidewall 8 and the bead 5 of a tire P for a passenger car, of size 205-650 R 440 A, shown in FIG. 1, comprise a carcass reinforcement 1 anchored in the bead 5 by wrapping around an anchoring bead wire 2 and extending axially from the inside of the tire to its outside to form an upturn 10. This upturn 10 completely surrounds a profiled element 3 arranged axially outside the bead wire 2 that anchors the carcass reinforcement 1, said profiled element 3, viewed in section, being in the form of an angular section of essentially triangular shape with its apex located approximately radially under the bead wire 2 (i.e. between the rotation axis and said bead wire), with two sides extending from said apex and a third side opposite said apex. The profiled element 3 is formed of a rubber mixture whose Shore A hardness when vulcanized is equal to 95 in the example given. The bead wire 2 is surmounted radially on the outside by a profiled element 6 formed of a rubber mixture with Shore A hardness lower than 40. Radially outside the profiled element 3 and axially outside the profiled element 6 is arranged a profiled element 7 of a rubber mixture whose hardness is low compared with the hardness of the mixture used for the profiled element 3.

The rim J on which the bead described above is fitted, comprises a frustoconical seat 42 extended axially on one side and the other by two frustoconical faces: axially on the outside by the face 410 of a hump 41 of small height, and axially on the inside by the face 43 that connects said seat 42 to a supporting surface 44, said supporting surface serving to support the tire in the event of loss of pressure. The face 410 is extended by the face 412 shaped as an arc of a circle in the figure plane, and this last face 412 is extended by an axially outer face 411.

In its portion radially on the inside relative to the bead wire 2, the bead 5 of the tire P, shown in the inflated condition, is in contact via its seat 90 with the seat 42 of the rim J and, axially outside that, via a wall 91 with the face 410 of the hump 41. In the extension of the wall 91 of the bead, a wall 92 partially covers the surface 412 of the hump 41 of the rim.

According to the invention, the axially outer wall of the bead 5 is provided with a protective rib J delimited on the outside by three faces which, viewed in meridian section in FIG. 1, have generatrices AB, CB, AD, the generatrix AB connecting the other two generatrices CB and AD. For convenience, in this document the faces are denoted by the name of their generatrix, for example the face whose generatrix is AB is denoted AB.

The generatrix AB of the axially outermost face AB of the rib T is in the present case a line segment making an angle β with a perpendicular to the rotation axis of the tire at most equal to 10° (in this case said angle equals 5°); the distance $D_{AB}$ between the end points A and B is preferably between 5 and 10 mm. The point A radially furthest from the rotation axis is here the point of the rib T which is axially furthest away from the equatorial plane.

The generatrix AB is joined radially on the inside to the wall of the bead by the generatrix BC, which in the example described is a line segment extended by another line segment CC' which makes an angle γ essentially equal to the angle β in the case shown. This later segment CC' joins the part 92 of the bead which is in contact with the radially outer portion 412 of the rim hump 41.

The point C' corresponds to the last point of the part 92 of the bead 5 that can come into contact with the upper portion 412 of the hump 41 when the tire is inflated.

The point of intersection B of the generatrix AB with the generatrix BC is located a distance d' from a line δ parallel to the rotation axis and passing through the radially outermost point of the upper part 412 of the hump 41, equal to the distance e increased by 6 mm. In the example described, e is 1.5 mm and corresponds to the distance which, in the figure plane, separates a line perpendicular to the rotation axis and passing through the point of the rib T furthest from the equatorial plane, from the line T1 perpendicular to the rotation axis and axially tangential to the outside of the hump 41.

The point C that limits the generatrix BC of the rib T is obtained as the point of intersection between the outside profile of the bead and a line, denoted T1, perpendicular to the rotation axis and tangential to the axially outer face 411 of the hump 41. An essential characteristic of the invention is that the point C must be located radially outside a virtual line passing through the last point C' of the bead in contact with the hump 41 and the point B, so as to generate sufficient bending flexibility in the bead to avoid any pinching of the rib between an external obstacle and said hump.

The radial distance d separating the points C and C' is denoted d; preferably, this distance d is larger than the distance d' separating the point B from the line δ, reduced by the axial distance e.

As for the generatrix AD of the radially upper face AD of the rib T, this is in the form of a circular arc whose center of curvature is located axially outside the tire and whose tangent Ta at the point A of intersection between the faces AB and AD makes an angle α equal to 45° with the equatorial plane.

In the variant illustrated in FIG. 1, the face AB of the protective rib is straight; of course, that face AB could have any shape, notably curved. The protective rib, which is continuous in the circumferential direction in the variant illustrated in FIG. 1, could also be discontinuous. The same face AB can be provided with a plurality of reliefs extending in a direction that makes an angle different from zero with the circumferential direction, in the manner described in the international application PCT 99/64258 already cited.

In addition, a protective rib can be positioned on each bead (inside and outside), or only on one of the two (for example, on the side most exposed to aggression by external objects).

For the sake of comparison with the prior art, in FIG. 1 a broken line indicates the external contour F of the bead corresponding to international application PCT 99/64258. It can be seen that in the present invention the protective rib is radially displaced relative to the hump.

Figure 2:
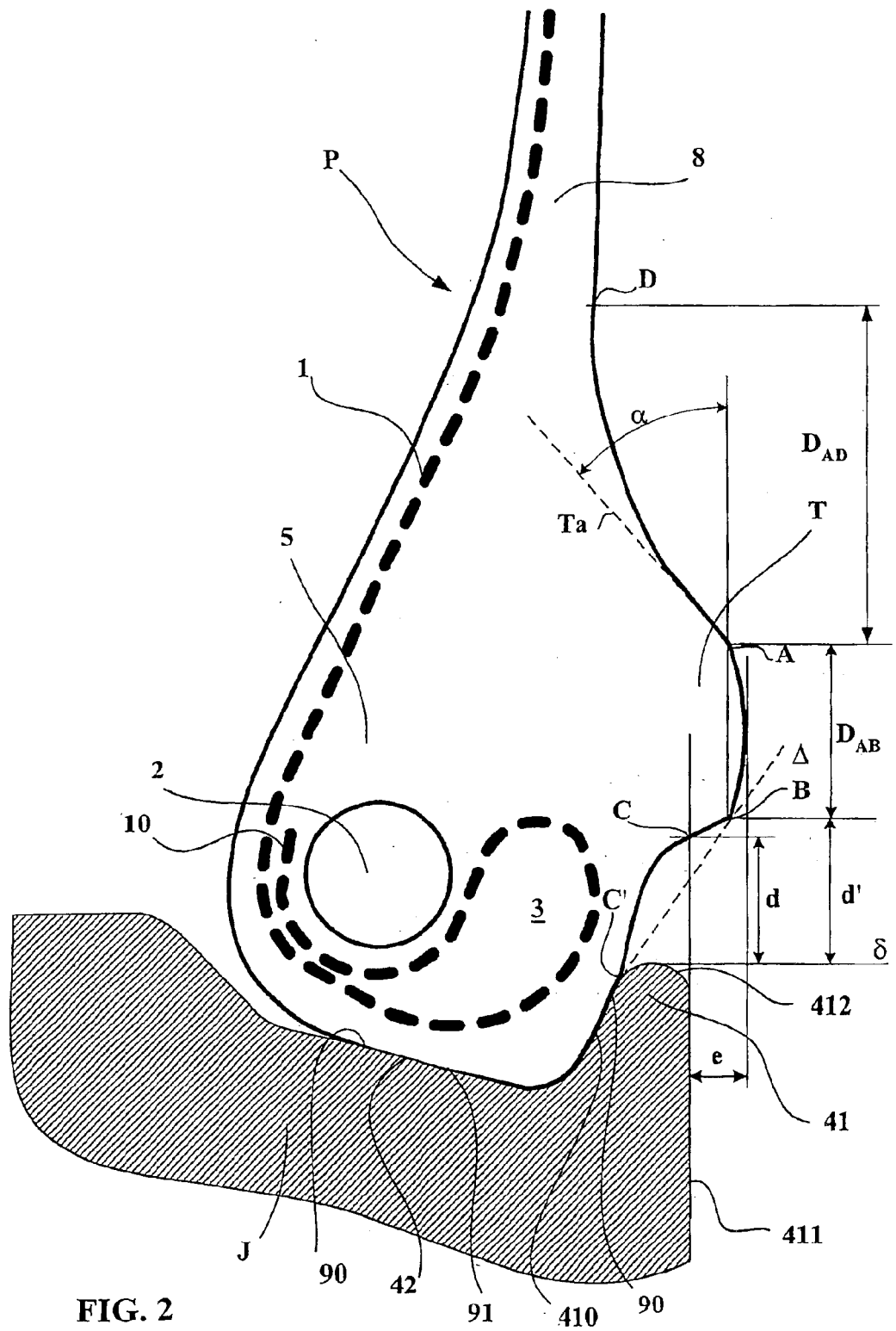
FIG. 2 shows a second variant of a tire according to the invention, which has a particular bead profile on at least one side.

FIG. 2 shows a tire bead according to another variant of the invention. For simplicity, the indexes shown in FIG. 2, when identical to those used in FIG. 1, refer to the same structural elements as those described with reference to FIG. 1.

According to this variant, the bead 5 of the tire P comprises a carcass reinforcement 1 anchored around a bead wire 2 and extending from the inside of the tire to its outside to form a loop around a rubber profiled element 3 and to form an upturn 10 axially between the carcass reinforcement 1 and the bead wire 2. The bead 5 shown corresponds to the bead facing the outside of the vehicle when the tire is fitted on its mounting rim J. The rim J has seats 42 inclined outwards and ending axially on the outside in humps 41 against which the toes of the bead 5 are in contact.

In the extension of the rim seat 42 the rim hump 41 comprises a first, inclined portion 410 which is essentially straight and itself extends radially on the outside into a portion 412 in the shape of an arc of a circle; the latter portion 412 is joined axially on the outside to an outer face 411 which is essentially straight and perpendicular to the rotation axis.

To protect the rim and especially its hump 41 and outer face 411, the bead 5 is provided with a protective rib T whose points axially furthest away from the face 411 are at a distance e therefrom equal to 1.5 mm. Viewed in a meridian section plane as in FIG. 2, the profile of the protective rib T comprises a face AB in the shape of an arc of a circle extended radially outwards by a circular arc between the point A and a point D located at a distance $D_{AD}$ equal to twice the distance $D_{AB}$ measured in the radial direction between the points A and B. The tangent Ta to said circular arc profile at the point A makes an angle α with the radial direction (direction perpendicular to the rotation axis) which is equal to 45° in the present case.

In addition, the profile AB of the protective rib T extends radially inwards along a profile BC which is substantially linear (the point C being obtained as the intersection between the profile of the bead radially below the rib T and a line T1 perpendicular to the rotation axis and tangential to the outer face 411 of the hump 41). The point C is located a radial distance d from the points radially furthest away from the hump 41 which, in the present case, is equal to 3 mm. The point B itself is located a radial distance d' from the edge 412 of the hump 41, equal to 4 mm. The profile of the face BC is radially outside a line Δ passing through the point B and through the last point C' of the bead in contact with the hump (when the tire is inflated).

The special feature of this variant of the invention, apart from the presence of the protective rib T, consists in the fact that the profile of the bead 5 between the point C' and the point C where said bead 5 joins the protective rib T, is shaped so as to extend the profile of the bead in contact with the inclined portion 410 of the hump 41 without contact with the radially outer portion 412 of the hump. In the case shown, the profile between C' and C is an extension of the profile of the inclined portion 410. Thus, the part of the bead in contact with the hump can move relative to said hump, enabling said bead 5 to pivot around its bead wire 2 and so producing an increase of the squeezing forces between said bead wire and the rim seat 42.

The profile of the bead between C' and B is located radially outside and axially inside a virtual line Δ passing through said points B and C'.

This last feature (the fact that the bead profile makes no contact with the radially outer part of the hump) can of course be implemented on the side facing inwards on the vehicle, without the need to provide a protective rib, while of course retaining the beneficial effect of such an arrangement. It goes without saying that this arrangement does not require the use of a protective rib for the rim, although clearly a tire for fitting on a rim such as the one described will preferably be provided with such a protective rib, at least on the side most exposed to external aggressions.

What is claimed is:

1. A tire P with radial carcass reinforcement, intended for mounting on a rim J at least one of whose seats is inclined outwards and is extended axially on the outside by a hump of small height, said hump comprising an axially outer wall, and comprising two sidewalls and at least one bead with a heel axially on the inside and a bead toe axially on the outside, said bead being provided with a protective rib T extending in the circumferential direction and having at least one point axially further away from the equatorial plane than the axially outer wall of the rim hump in order to protect said rim, wherein, when this tire is mounted on its mounting rim and viewed in meridian cross-section:

said circumferential protective rib T is delimited axially on the outside by an axially outer face AB connected to the outer walls of the sidewall and the bead by radially upper and lower faces AD and BC, respectively, the axially outermost point of the axially outer face AB of said protective rib T is a distance e at least equal to 0.5 mm further out than the axially outer wall of the hump of the rim, the radial distance d' between the radially innermost point of the axially outer face of said protective rib T and the radially outermost point of the rim hump, is greater than 4 mm, the angle of the segment joining the end points of the axially outer face of said protective rib T with a direction perpendicular to the rotation axis is at most equal to ±10°, the entire profile of said lower face BC connecting said axially outer face AB of said protective rib T and the profile of the bead is located radially outside a virtual segment whose ends are on the one hand the radially innermost point B of the axially outer face of said protective rib and, on the other hand, a point C' of the tire bead that is the last point in contact with the hump of the rim.

2. The tire according to claim 1, wherein the distance e is between 1 and 1.5 mm.

3. The tire according to claim 1, wherein the length of the segment joining the end points A and B of said axially outer face AB of said protective rib T, is between 5 and 10 mm.

4. The tire according to claim 1, wherein said angle between the segment joining the end points A and B of said axially outer face AB of said protective rib T and a direction perpendicular to the rotation axis, is at most equal to ±5°.

5. The tire according to claim 1, wherein said entire upper connecting face AD between said rib T and the sidewall is located radially outside a line Ta passing through the radially outermost point A of said face AB axially on the outside of said protective rib T and tangential to said profile at that point A, and said line Ta makes an angle of at most 55° with the equatorial plane.

6. The tire according to claim 1, wherein said outside faces AB, AD, BC of said protective rib T are reinforced with at least one reinforcement comprising textile reinforcements embedded in an abrasion-resistant rubber mixture.

7. The tire according to claim 1, further comprising a point C at the point of intersection between the outside profile of the bead and a line perpendicular to the rotation axis and tangential to the axially outer face of the hump, wherein the profile of the bead between said point C and C' is axially inside and radially outside a line that extends the axially inner profile of the hump, so as to avoid any contact between the bead and the radially outer part of the hump.

8. The tire according to claim 5, further comprising a point C at the point of intersection between the outside profile of the bead and a line perpendicular to the rotation axis and tangential to the axially outer face of the hump, wherein the profile of the bead between said points C and C' is axially inside and radially outside a line that extends the axially inner profile of the hump, so as to avoid any contact between the bead and the radially outer part of the hump.

* * * * *